Nov. 3, 1953
R. L. COLES
2,657,493
FISHING ROD
Filed Oct. 18, 1950
2 Sheets-Sheet 1
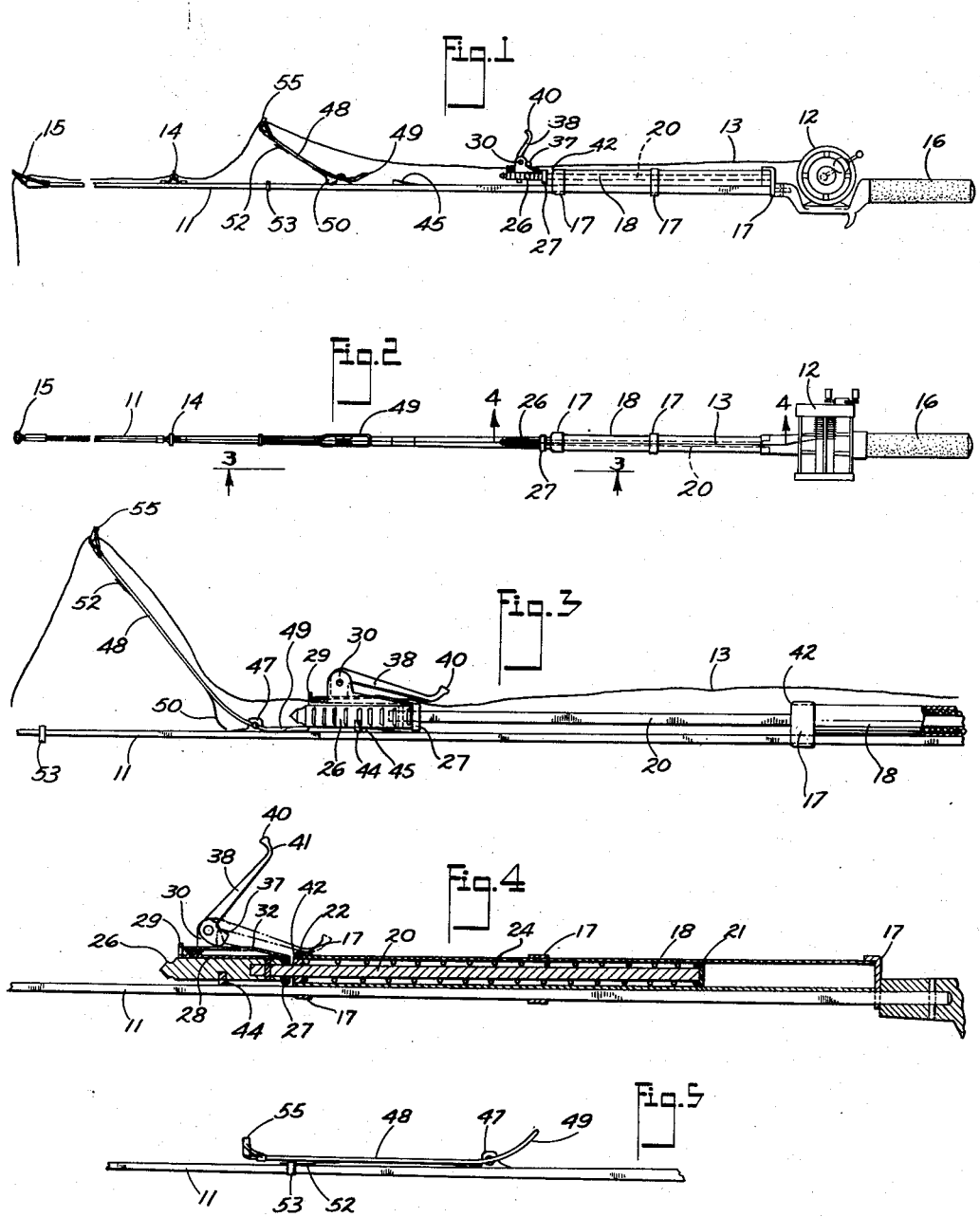
INVENTOR.
ROBERT L COLES
BY
*J. D. Douglass*
HIS ATTORNEY Nov. 3, 1953 R. L. COLES 2,657,493
FISHING ROD
Filed Oct. 18, 1950 2 Sheets-Sheet 2
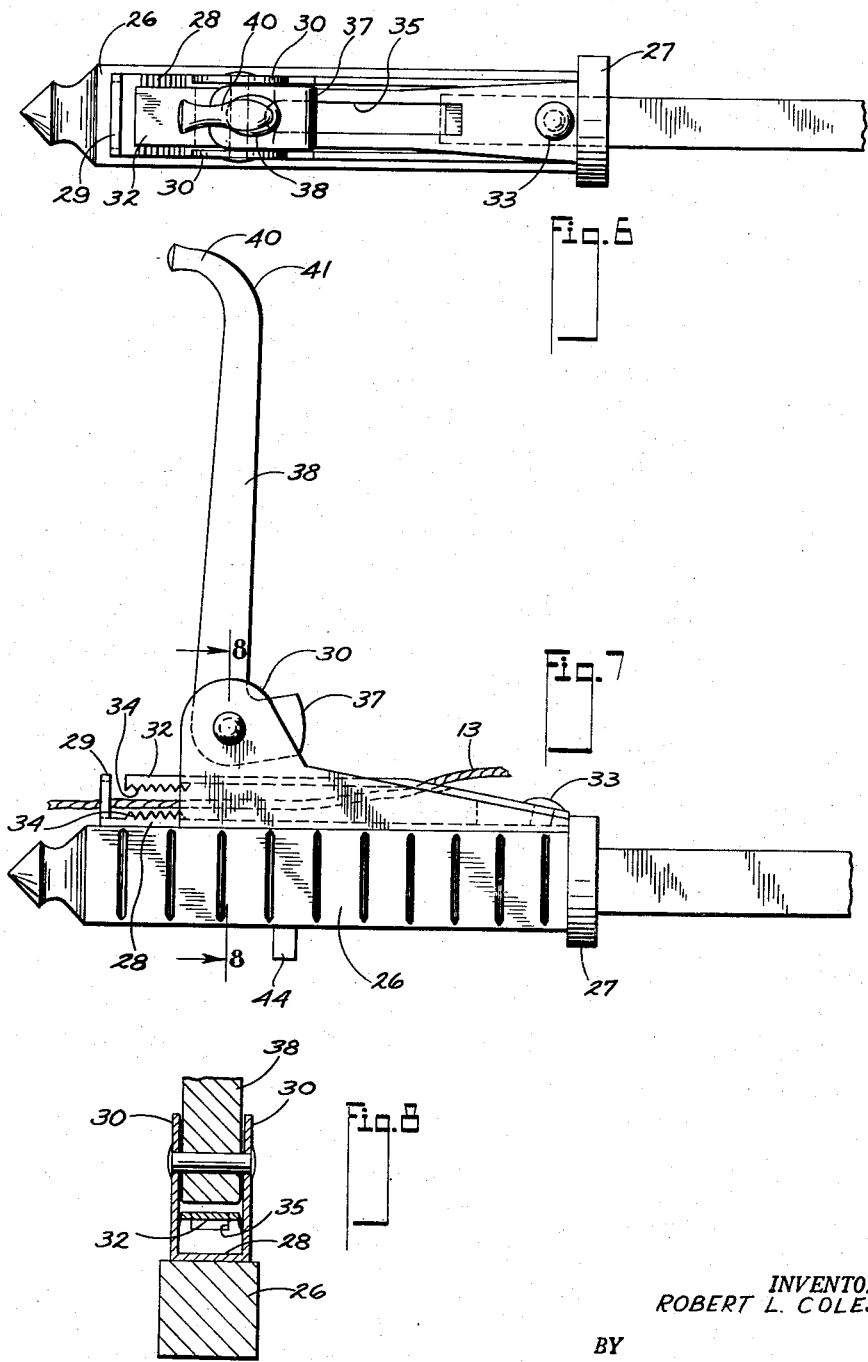
INVENTOR.
ROBERT L. COLES
BY
J. D. Douglass
HIS ATTORNEY Patented Nov. 3, 1953

2,657,493

UNITED STATES PATENT OFFICE 2,657,493

FISHING ROD

Robert L. Coles, Cleveland, Ohio

Application October 18, 1950, Serial No. 190,769

12 Claims. (Cl. 43—16)

This invention relates to fishing tackle, and more particularly to an attachment for a fishing rod which will automatically set the hook in the mouth of a fish when the bait is hit.

In the sport of "still-fishing," a fisherman may often become fatigued or bored, or both, by the necessary continued watchfulness required and the labor of holding a rod in continuous readiness to set the hook in a fish's mouth should one strike the bait. The ordinary custom at such times is to lay the rod down and doze or otherwise distract one's attention. However, this leaves the rod unattended, and should a fish strike, there would be nothing and no one to set the hook and make certain that the fish was caught.

By my invention, I provide an automatic device which will not only set the hook in such a situation, but also will release the line immediately thereafter to allow the fish to run against the drag of the reel or to permit immediate reeling in and/or playing of the fish. In addition, the device emits a very audible click which will arouse the dozing fisherman if necessary.

These are accomplished by means more fully described in the following specification and the figures which form a part thereof.

In the drawings:

Fig. 1 is a side elevational view of an embodiment of my invention in a released state, installed on a rod;

Fig. 2 is a top plan view of the device;

Fig. 3 is a detailed view from line 3—3 of Fig. 2 of the trigger release and clamping device in a cocked state and drawn to an enlarged scale;

Fig. 4 is a sectional view along line 4—4 of Fig. 2 drawn to the same scale as Fig. 3;

Fig. 5 is a detailed enlarged view of the trigger in a folded state;

Fig. 6 is a top plan view of the clamping device in a released state to a still greater scale;

Fig. 7 is a side elevational view of the clamping device; and

Fig. 8 is a sectional view along line 8—8 of Fig. 7.

Briefly, my invention comprises a device for use in conjunction with, or built as a part of a fishing rod having a reel and a line. The device consists of a spring loaded plunger urged toward the handle of the rod and carrying a clamping device for holding the line. Farther up the rod toward the tip is a catch adapted to hold the plunger against the force of the spring, and a trigger carrying the line which will release the plunger from the catch when the line is pulled. As the plunger is snapped back toward its original position, and just before it reaches that position, the handle of the clamping device is engaged by the mounting means for the plunger and the line is released from the clamp so that the fish may run against the drag of the reel or may be reeled in by the fisherman without the necessity of releasing the clamp manually.

More particularly, and as illustrated in the figures, the device is mounted on a fishing rod 11. A conventional reel 12 and line 13 are used, and conventional line guides 14 on the rod portion near the tip and a tip guide 15 are used.

On the rod portion near the handle 16, a plunger mounting is fixed by brackets or straps 17. As illustrated (Figs. 1, 2 and 4), this mounting is preferably a closed tube or barrel 18 to protect the inner parts from water and to keep the fisherman's fingers from becoming pinched. It is conceived, however, that an open mounting could be used. The straps 17 are fastened to the tube 18 in any convenient way, such as sweating, spot welding or the like, and may be either clamped to the rod 11 or permanently fixed thereon by a method similar to that used to fasten the straps to the tube 18.

A plunger having a rod 20 and a head 21 is slidably disposed in the tube 18. The rod 20 is preferably square or rectangular in cross sectional shape, and extends through a matched opening in a cap or plug 22 at the outer end of the tube 18. Thus, the plunger is prevented from rotating in the tube. A compression spring 24 is disposed about the rod 20 between the head 21 and the cap or plug 22 to urge the plunger to a first position toward the handle 16.

A block 26 is fixed to the outer end of the rod 20 providing a shoulder which will butt up against the plug 22 and the end of the tube 18. Cushioning washers 27 of leather or the like are preferably disposed between the block 26 and tubes 18 to avoid a hammering effect on the metal parts.

A line holding clamping device is mounted on top of the block 26. This device includes a lower jaw member 28 securely fixed to the block. At the outer end the member 28 is bent upwardly and a hole is cut therethrough to form a line guide 29. The sides of the member 28 are also bent upward and formed into ears 30 for the support of a clamping cam device described hereinafter.

An upper jaw member 32 is fixed to the lower member 28 at the end nearest the handle 16 by a rivet 33, or the like, and extends over the lower member between the ears 30. This upper member 32 is preferably formed of a resilient material such as brass, and is so mounted that its normal position is spaced from the lower member 28 at its free end. Either or both members may be formed with knurled or ribbed surfaces 34 near the free end so that the line may be more firmly held. An elongated slot 35 is formed in the center portion of the upper jaw 32 through which the line 13 from the reel 12 passes, thence beneath the ribbed surface 34 and through the guide 29.

A clamping member is pivotally mounted between the ears 30 for clamping the upper jaw 32 firmly down on the lower 28 to hold the line. This device is formed with a cam part 37 which is adapted to engage the upper jaw to force it downward, and a handle part 38 extending from the pivot approximately at a right angle to the cam part. When the clamping device is closed, that is, when the jaws are clamped together on the line (Fig. 3) the handle 38 extends along the upper jaw in the direction of the plunger mounting tube 18. At its end, the handle 38 is curved upward at 40 thus providing a convex curved surface 41 on its underside. This surface 41 is positioned so that when the plunger snaps to its position in Fig. 4, the surface 41 strikes the edge 42 of the tube 18. The edge may be rounded at this point to avoid scoring the surface 41 upon the impact. Since the action of striking the tube 18 is in the nature of an impact, the handle 38 is impelled upward with sufficient force to release the cam part 37 from the upper jaw 32 and allow the upper jaw to free the line. The line may then be reeled in or run out without the necessity of manually opening the clamping device.

Beneath the block 26, a stud 44 extends downwardly toward the rod 11. An abutment member 45 is mounted on the rod 11 spaced from the end of the tube 18. As shown in Fig. 3, the stud 44 is adapted to engage the member 45 in a latching engagement to hold the plunger in an outward position on the rod against the force of the spring 24.

The latching engagement of the stud 44 with the abutment member 45 is broken by the action of a trigger mechanism. The preferred form, as shown in the drawings, comprises a bearing member 47 fixed to the rod 11 either permanently or by some rigid temporary means. Pivotally mounted on this bearing member 47 is a trigger lever having one arm 48 extending at an angle from the pivot upwardly and toward the tip of the rod. Another arm 49 extends from the pivot along the rod toward the handle 16 and beneath the block 26 in its cocked position (Fig. 3). A leaf spring 50 extending downward from the arm 48 into engagement with the rod 11 serves to hold the trigger lever in its upright position as shown in Fig. 1. However, for ease in carrying or casting, a tongue 52 is provided on the lever engageable with a sliding ring 53 on the rod 11 to hold the trigger lever in a downward position as shown in Fig. 5.

As best shown in Fig. 3, the trigger is adapted to be tripped by a pull on the line 13. The line passes from the reel through the clamping device as described above, then through the line guide 29 on the block 26. From this guide, the line extends upward at a relatively sharp angle through a tip guide 55 on the end of the arm 48. From there, the line extends downward to the first line guide 14. It is apparent that a pull on the line will cause the arm 48 to be pulled downward, thus carrying the arm 49 to disengage the stud 44 from the abutment 45. The plunger is then pulled quickly back into the tube 18 by the spring 24, thus giving the line a quick jerk. This jerk is sufficient to set the hook in the mouth of the fish which originally pulled the line. As the plunger reaches the end of its travel, the clamping device is released as described above and thus the fish is free to run against the drag of the reel, or the fisherman may reel in the fish without the necessity of first releasing a line clamp manually. The impact of the block 26 striking the cap 22 while it is cushioned by the washers still is sufficient to cause a very audible clicking sound which may be of value as a warning that the device has been tripped.

Thus it is apparent that my device performs a three-fold function automatically. It sets the hook, releases the line and warns of its release.

Having thus described my invention, I am aware that numerous and extensive departures may be made therefrom without departing from the spirit or scope thereof.

I claim:

1. A device of the class described comprising a rod having a handle and a tip and adapted to receive a reel carrying a line, a barrel member mounted on said rod, a plunger slidably disposed in said barrel, biasing means in said barrel to urge said plunger to a first position toward said handle, line holding means on said plunger adapted to releasably hold said line, catch means on said rod adapted to hold said plunger in a second position toward said tip against the force of said biasing means, and trigger means adapted to release said plunger from said catch means in response to a pull on said line, said line holding means being adapted to be released by said barrel member as said plunger is pulled to said first position.

2. A device of the class described comprising a rod having a tip and a handle, and adapted to receive a reel carrying a line, a barrel member mounted on said rod, a plunger slidably disposed in said barrel, biasing means in said barrel to urge said plunger to a first position toward said handle, line holding means on said plunger adapted to releasably hold said line, a release handle for said line holding means extending toward said rod handle, said release handle having a cam surface adapted to engage said barrel member when said plunger is in said first position, catch means on said rod adapted to hold said plunger in a second position toward said tip against the force of said biasing means, and trigger means mounted on said rod adapted to release said plunger from said catch means in response to a pull on said line, said release handle being impelled to open said holding means and release said line when said cam surface is engaged by said barrel.

3. In a device of the class described having a plunger support means mounted on a fishing rod having a reel and line, a plunger slidably disposed in said support means, and a catch trigger means to releasably hold said plunger in a displaced position drawn partially out of said support against the action of a biasing means; line holding means on said plunger comprising a lower jaw fixed to said plunger, an upper jaw springably connected to said plunger, said upper jaw being normally disengaged from said lower jaw, jaw closing means pivoted to said plunger adapted to clamp said upper jaw against said lower jaw to hold said line and a handle on said closing means extending toward said support means, said handle being formed with a cam surface adapted to engage said support means to release said jaw closing means.

4. For use with a fishing rod adapted to receive a reel carrying a line, an attachment for automatically setting a fish hook comprising plunger support means adapted to be fixed to said rod, a plunger slidably disposed in said support means, line holding means on said plunger adapted to releasably hold said line, biasing means urging said plunger to a first position, catch means adapted for mounting on said rod to engage said plunger and hold it in a second position and trigger means adjacent said catch means on said rod adapted to engage said plunger to release it from said catch means in response to a pull on said line.

5. For use with a fishing rod adapted to receive a reel carrying a line, an attachment for automatically setting a fish hook comprising a plunger support means adapted to be fixed to said rod, a plunger slidably disposed in said support means, line holding means on said plunger adapted to releasably hold said line, biasing means urging said plunger to a first position, catch means adapted to be mounted on said rod to engage said plunger and hold it in a second position and trigger means adjacent said catch means on said rod adapted to engage said plunger to release it from said catch means in response to a pull on said line, said line holding means being adapted to release said line as said plunger is moved to its first position.

6. For use with a fishing rod adapted to receive a reel carrying a line, an attachment for automatically setting a fish hook comprising plunger support means adapted to be fixed to said rod, a plunger slidably disposed in said support means, line holding means on said plunger adapted to releasably hold said line, biasing means urging said plunger to a first position, catch means adapted for mounting on said rod to engage said plunger and hold it in a second position and trigger means adjacent said catch means on said rod adapted to engage said plunger to release it from said catch means in response to a pull on said line, said line holding means being formed with a cam surface, said cam surface being adapted to engage said support means to release said line from said line holding means as said plunger is moved to its first position.

7. A device of the class described comprising a rod having a tip and a handle and adapted to receive a reel carrying a line, plunger support means mounted on said rod, a plunger slidably disposed in said support means, biasing means urging said plunger to a first position toward said handle, said plunger being formed with depending means extending toward said rod, an abutment on said rod adapted to engage said depending means to hold said plunger in a second position, trigger means pivotally mounted on said rod formed with a release portion extending from the pivotal axis toward said plunger and an arm extending at an angle to said release portion, a line guide mounted on said arm, spring means on said arm adapted to hold it normally in a raised position, said line being adapted to pass through said guide, and said arm being in position to be pulled down by a pull on said line to thereby cause said release portion to release said depending means from said abutment to allow said plunger to snap to said first position.

8. A device of the class described comprising a rod having a tip and a handle and adapted to receive a reel carrying a line, plunger support means mounted on said rod, a plunger slidably disposed in said support means, biasing means urging said plunger to a first position toward said handle, said plunger being formed with depending means extending toward said rod, an abutment on said rod adapted to engage said depending means to hold said plunger in a second position, trigger means pivotally mounted on said rod formed with a release portion extending from the pivotal axis toward said plunger and an arm extending at an angle to said release portion, a line guide mounted on said arm, spring means on said arm adapted to hold it normally in a raised position, said line being adapted to pass through said guide, said arm being in position to be pulled down by a pull on said line to thereby cause said release portion to release said depending means from said abutment to allow said plunger to snap to said first position, and hold-down means in connection with said rod and said arm to hold said arm in a lowered position for casting.

9. A device of the class described comprising a rod having a tip and a handle and adapted to receive a reel carrying a line, plunger support means mounted on said rod, a plunger slidably disposed in said support means, biasing means urging said plunger to a first position toward said handle, said plunger being formed with depending means extending toward said rod, an abutment on said rod adapted to engage said depending means to hold said plunger in a second position, trigger means pivotally mounted on said rod formed with a release portion extending from the pivotal axis toward said plunger and an arm extending at an angle to said release portion, a line guide mounted on said arm, spring means on said arm adapted to hold it normally in a raised position, said line being adapted to pass through said guide, said arm being in position to be pulled down by a pull on said line to thereby cause said release portion to release said depending means from said abutment to allow said plunger to snap to said first position, and line clamping means mounted on said plunger adapted to hold said line releasably.

10. A device of the class described comprising a rod having a tip and a handle and adapted to receive a reel carrying a line, plunger support means mounted on said rod, a plunger slidably disposed in said support means, biasing means urging said plunger to a first position toward said handle, said plunger being formed with depending means extending toward said rod, an abutment on said rod adapted to engage said depending means to hold said plunger in a second position, trigger means pivotally mounted on said rod formed with a release portion extending from the pivotal axis toward said plunger and an arm extending at an angle to said release portion, a line guide mounted on said arm, spring means on said arm adapted to hold it normally in a raised position, said line being adapted to pass through said guide, said arm being in position to be pulled down by a pull on said line to thereby cause said release portion to release said depending means from said abutment to allow said plunger to snap to said first position, and line clamping means mounted on said plunger being adapted to hold said line releasably, said clamping means being adapted to be released automatically as said plunger is snapped to said first position.

11. A device of the class described comprising a rod having a tip and a handle and adapted to receive a reel carrying a line, plunger support means mounted on said rod, a plunger slidably disposed in said support means, biasing means urging said plunger to a first position toward said handle, said plunger being formed with depending means extending toward said rod, an abutment on said rod adapted to engage said depending means to hold said plunger in a second position, trigger means pivotally mounted on said rod formed with a release portion extending from the pivotal axis toward said plunger and an arm extending at an angle to said release portion, a line guide mounted on said arm, spring means on said arm adapted to hold it normally in a raised position, said line being adapted to pass through said guide, said arm being in position to be pulled down by a pull on said line to thereby cause said release portion to release said depending means from said abutment to allow said plunger to snap to said first position, and line clamping means mounted on said plunger being adapted to hold said line releasably, comprising a lower jaw member mounted on said plunger and formed with upstanding ears, an upper jaw member resiliently mounted above said lower jaw member and cam means pivotally mounted on said ears adapted to clamp said upper jaw member against said lower jaw.

12. A device of the class described comprising a rod having a tip and a handle and adapted to receive a reel carrying a line, plunger support means mounted on said rod, a plunger slidably disposed in said support means, biasing means urging said plunger to a first position toward said handle, said plunger being formed with depending means extending toward said rod, an abutment on said rod adapted to engage said depending means to hold said plunger in a second position, trigger means pivotally mounted on said rod formed with a release portion extending from the pivotal axis toward said plunger and an arm extending at an angle to said release portion, a line guide mounted on said arm, spring means on said arm adapted to hold it normally in a raised position, said line being adapted to pass through said guide, said arm being in position to be pulled down by a pull on said line to thereby cause said release portion to release said depending means from said abutment to allow said plunger to snap to said first position, and line clamping means mounted on said plunger adapted to hold said line releasably, comprising a lower jaw member mounted on said plunger and formed with upstanding ears, an upper jaw member resiliently mounted on said lower jaw and formed with an opening through which the line may pass and extend between said jaw members, and a handle device pivoted in said ears and formed with a cam part adapted to clamp said upper jaw member against said lower jaw member and a handle part adapted to engage said plunger support means to release said cam part when said plunger is snapped from said second to said first position.

ROBERT L. COLES.

References Cited in the file of this patent

UNITED STATES PATENTS

| Number | Name | Date |
| --- | --- | --- |
| 263,638 | Wentworth | Apr. 29, 1882 |
| 657,518 | Cook | Sept. 11, 1900 |
| 671,914 | Nesbit | Apr. 9, 1901 |
| 2,491,731 | Hall | Dec. 20, 1949 |
| 2,590,721 | Muth | Mar. 25, 1952 |